Feb. 13, 1934.  L. L. CHONG  1,946,931
SELF CLEANING DEVICE FOR ADJUSTMENT SCREWS
Filed Oct. 7, 1932
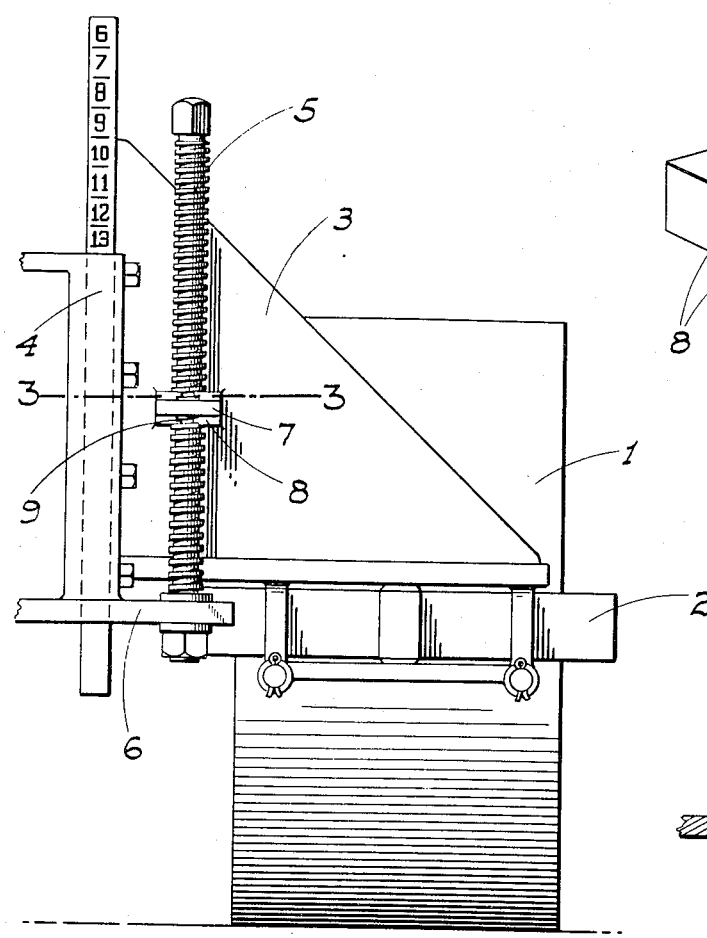
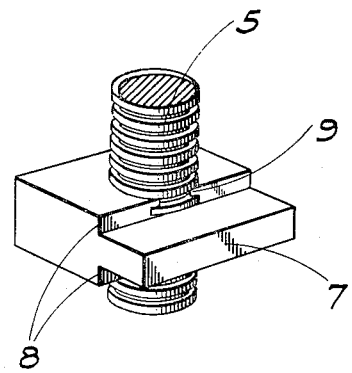
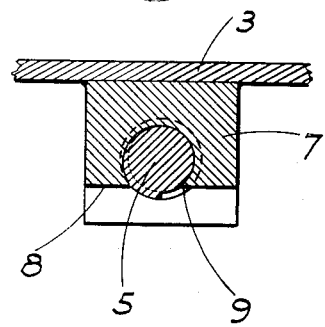
INVENTOR
Look L. Chong Patented Feb. 13, 1934

1,946,931

UNITED STATES PATENT OFFICE 1,946,931

SELF-CLEANING DEVICE FOR ADJUSTMENT SCREWS

Look L. Chong, Isleton, Calif.

Application October 7, 1932. Serial No. 636,637

3 Claims. (Cl. 74—40)

This invention relates to agricultural implements. The present invention particularly relates to the adjustment screws which support the ground engaging rollers and by means of which said rollers may be adjusted and held at different levels relative to the frame so as to govern the digging depth of the rotary root chopping unit. Due to the conditions under which the implement operated, it is constantly enveloped in a cloud of fine dust or dirt, which of course settles on every exposed part. Since owing to the very nature of the use and mounting of the adjustment screws, it is impossible from a practicable standpoint to enclose the adjustment screws, their threads soon become filled with this fine dirt. If an attempt is made to turn the screws in their bearings when they are thus choked with dirt it will be found next to impossible to do so on account of the jamming effect of the dirt, and the screws must be first cleaned off with a wire brush or similar implement to temporarily rid them of the dirt.

This operation for the four screws of the complete machine takes about a half hour or more and since it may be necessary to make this adjustment several times in the course of a day's work, considerable valuable time is lost inasmuch as the operation of the entire machine must be halted while the cleaning and adjusting of the screws is being affected. Oiling or greasing the screws in an endeavor to make them work smoothly and overcome the jamming action is of no effect, and in fact only makes matters worse since the fine dirt and oil form a plastic sticky cake which is harder to clean off than the dirt alone.

After considerable experimentation in an endeavor to overcome this objectionable feature I evolved a special form of bearing for the adjustment screws which positively cleans the screw threads out before the threads engage the tapped threads of the bearings as the screws are turned, and regardless of the direction in which said screws may be turned. This self-cleaning bearing therefore forms the object of this invention and is of a simple nature requiring no attention or adjustment at any time and is so inexpensive that it does not appreciably add to the cost of the machine as a whole.

These objects I accomplish by means of such structure and relative arrangement of parts as will fully appear by a perusal of the following specification and claims.

In the drawing similar characters of reference indicate corresponding parts in the several views:

Fig. 1 is an end view of a ground engaging roller of an agricultural implement showing my improved self-cleaning bearing and one of the adjustment screws.

Fig. 2 is a perspective view of the bearing shown in connection with a portion of a screw.

Fig. 3 is a sectional plan on the line 3—3 of Fig. 1.

Referring now more particularly to the characters of reference on the drawing, the numeral 1 denotes a ground engaging roller of an agricultural digging implement of the type shown in said co-pending application or others of a like nature, said roller being mounted in a horizontal yoke 2 which is engaged at its ends and supported by vertical brackets 3. Each bracket along its back vertical edge is slidably supported in a vertical guide 4 formed on the frame of the implement.

Each bracket is vertically adjusted and held in any position relative to the guide and frame by a vertical screw 5 disposed adjacent the bracket and guide. At its lower end the screw is turnably supported by a horizontal lug 6 projecting laterally from the bottom of the guide. Intermediate its ends the screw is threaded through a tapped boss 7 rigid with and projecting from the adjacent face of the bracket.

The boss both at the top and bottom is cut back from its outer edge parallel thereto as shown at 8 to a depth sufficient to expose a portion of the threads of the screw. The vertical edges of the cut away portion being substantially tangent to the screw form in effect sharp edged scrapers, as at 9, where they intersect the tapped threads of the screw. Since the boss from top to bottom is tapped to engage the screw threads these sharp edged scraping elements engage the bottom as well as the sides and top of the screw threads. They thus act when the screw is turned in either direction to dig out or scrape off any dirt which may be accumulated on the screw immediately above or below the boss and sweep and deflect such dirt outwardly, thus preventing it from being drawn into the uncut portion of the boss and causing the screw to become jammed.

The height of each cut away portion is substantially equal to the pitch of the screw so that one thread and the adjacent thread groove will be simultaneously engaged by each of the scraping elements 9.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A self-cleaning means for an adjustment screw comprising, with a screw, a boss through which the screw is threaded, and scraper elements disposed substantially tangent to and engaging the thread of the screw from opposite directions and at both ends of the boss.

2. A self-cleaning means for an adjustment screw comprising, with such screw, a boss through which the screw is threaded; said boss on one end being cut back for a certain depth to a line substantially tangent to the bottom of the thread-grooves so as to expose the corresponding portions of the threads and form chisel-like scrapers engaging said exposed groove and thread portions.

3. A self-cleaning means for an adjustment screw comprising the combination with such screw of a boss through which the screw is threaded such boss being cut back to a depth to expose the threads adjacent the cut and at which depth of cut the adjacent cut faces of the boss will extend in a line tangent to the exposed faces of the threads and provide chisel-like scrapers to clean accumulate dirt from such exposed portions of the threads.

LOOK L. CHONG.